United States Patent [19]

Harth et al.

[11] Patent Number: 5,667,861

[45] Date of Patent: Sep. 16, 1997

[54] MAGNETO-OPTICAL DISK

[75] Inventors: Klaus Harth, Altleiningen; Hartmut Hibst, Schriesheim, both of Germany

[73] Assignee: BASF Aktiengesellschaft, Ludwigshafen, Germany

[21] Appl. No.: 663,516

[22] Filed: Mar. 4, 1991

[30] Foreign Application Priority Data

Mar. 14, 1990 [DE] Germany ............ 40 080 75.7

[51] Int. Cl.$^6$ .................................... G11B 5/66
[52] U.S. Cl. ................... 428/64.3; 428/694 ML; 428/694 SC; 428/694 DE; 428/694 RE; 428/694 NF; 428/610; 428/698; 428/900
[58] Field of Search .................. 428/900, 64.3, 428/694 ML, 694 SC, 694 DE, 694 RE, 694 NF, 610, 698

[56] References Cited

U.S. PATENT DOCUMENTS

| | | | |
|---|---|---|---|
| 4,670,316 | 6/1987 | Kryder | 428/65.3 |
| 4,670,353 | 6/1987 | Sakurai | 428/606 |
| 4,693,943 | 9/1987 | Kishi et al. | 428/670 |
| 4,710,418 | 12/1987 | Takano et al. | 428/192 |
| 4,734,334 | 3/1988 | Matsushima et al. | 428/487 |
| 4,751,124 | 6/1988 | Matsuzawa et al. | 428/65.1 |
| 4,885,134 | 12/1989 | Hatwar | 420/416 |
| 4,889,756 | 12/1989 | Barzynski et al. | 428/64.8 |

FOREIGN PATENT DOCUMENTS

| | | |
|---|---|---|
| 184 034 | 6/1986 | European Pat. Off. . |
| 229 292 | 7/1987 | European Pat. Off. . |
| 229292 | 7/1987 | European Pat. Off. . |
| 302 393 | 2/1989 | European Pat. Off. . |

OTHER PUBLICATIONS

Journal Dephysique, Band C8, 1971–1972, 1988.
Abstract JA 62 267 942, Nov. 1987.
Abstract JA 63 140 076, Jun. 1988.
Gimenez et al., IEEE Transactions on Magnetics, vol. 24, No. 2 Mar. 1988, pp. 1738–1740.
Pat. Abst. of Japan, vol. 12, No. 163 (May 18, 1988) citing JP-A-62 277644.
Pat. Abst. of Japan, vol. 6, No. 255 (Dec. 14, 1982) citing JP-A-57 152555.
Pat. Abst. of Japan, vol. 11, No. 42 (Feb. 6, 1987) citing JP-A-61 211851.
Pat. Abst. of Japan, vol. 12, No. 303 (Aug. 18, 1988) citing JP-A-63 074143.
Pat. Abst. of Japan, vol. 10, No. 87 (Apr. 5, 1986) citing JP-A-60 231306.

*Primary Examiner*—Leszek Kiliman
*Attorney, Agent, or Firm*—Keil & Weinkauf

[57] ABSTRACT

A magneto-optical disk having at least one optically transparent, dimensionally stable substrate and at least one magneto-optical recording layer of a chromium-containing lanthanide/transition metal alloy, wherein the chromium concentration changes in the horizontal direction, and a process for the producton of the magneto-optical disks.

7 Claims, No Drawings

MAGNETO-OPTICAL DISK

The present invention relates to a novel magneto-optical disk having at least one optically transparent, dimensionally stable substrate and at least one magneto-optical recording layer consisting of a chromium-containing lanthanide/transition metal alloy, and novel process for the production of this magneto-optical disk.

Known magneto-optical recording layers are, for example, monocrystalline garnet layers (eg. yttrium iron garnet), polycrystalline layers of MnBi or amorphous layers of alloys of lanthanides (RE) and transition metals (TM), abbreviated below to (RE-TM).

Recently, the amorphous (RE-TM) layers have been preferred since these recording layers can be produced with large areas by cathode sputtering methods or by vapor deposition, and the recorded signals can be read with a low noise level. Many amorphous (RE-TM) alloys, for example Tb—Fe, Tb—Fe—Co, Gd—Tb—Fe—Co, Dy—Fe—Co, Nd—Tb—Fe—Co or Nd—Dy—Fe—Co, additionally have the advantage that the ferrimagnetic coupling of the RE and TM atoms gives a high coercive force in the direction at right angles to the plane of the layer. The compensation temperature $T_{comp}$, at which the magnetizations of the RE and TM atoms cancel one another and at which said coercive force is very high, can be adjusted within wide limits by a suitable choice of the composition. Owing to the high coercive force, stored magnetic domains (see below) are extremely stable close to the compensation temperature, so that good data security is ensured.

These known magneto-optical disks are used for recording or writing data with the aid of laser beams (for example pulse-modulated laser beams), which are focused on the magneto-optical recording layers and strike the latter at right angles.

During the recording or writing of data, an external auxiliary magnetic field is applied to the magneto-optical disk, the field lines of said field being oriented at right angles to the surface of said magneto-optical recording layers. In addition, the magneto-optical recording layers may have a correspondingly oriented intrinsic magnetic field. In a known alternative write process, the external magnetic field is time-modulated.

It is known that the magneto-optical recording layers which consist of amorphous ferrimagnetic (RE-TM) alloys, are magnetized at right angles to their surface and may be multi-stratum are heated by the write laser beam in the region of the point of contact during writing of the data. As a result of the heating, the coercive force $H_c$ of the alloys decreases. For layers where $T_{comp}$ is higher than room temperature, the coercive force initially increases but likewise decreases above $T_{comp}$. If, at a critical temperature dependent on the particular alloy used, the coercive force $H_c$ exceeds the sum of the field strengths of the applied (external) magnetic auxiliary field and of the intrinsic field, a region which has a magnetization direction opposite to the original direction is formed at the point of contact. Such a region is also referred to as a magnetic domain.

The diameter and the shape of the domain formed depend both on the size of the laser spot, the laser power, the laser pulse time and the strength of the external magnetic field and on the magnetization $M_s$ and the coercive force $H_c$ of the recording layer. Circular, smooth-edged domains are desirable since they give a strong signal and a high signal/noise ratio during reading.

In the write process, smooth-edged domains are obtained in particular when the magnetization and coercive force of the magneto-optical storage layer have a suitable temperature dependence and the Curie temperature $T_c$ of the storage layer is reached at least approximately during heating by the laser beam.

At temperatures substantially above $T_c$, enlarged, overlapping domains having poor signal/noise ratios are obtained. On the other hand, at temperatures substantially below $T_c$, the nucleation of domains having the opposite magnetization is possible only with external magnetic fields which are very high and therefore unsuitable for use.

According to Journal de Physique C8 (1988), 1971–1972, for example for a storage layer made from GdTbFe the temperature dependence of the coercive force $H_c$ is suitable when the difference $T_c - T_{comp}$ is from 50 to 250K. At high magnetization values of the magneto-optical storage layer and with too flat a temperature gradient of $H_c$, nonuniform movement of domain walls is promoted; on the other hand, if the temperature gradient is too steep, microscopic inhomogeneities have a greater effect. In both cases, frayed domains having poor signal/noise ratios are obtained.

It is known that, during writing of the data, the write laser beam is moved over the surface of the magneto-optical disks or their magneto-optical recording layer, relative to the said surface. In general, the laser beam is focused on the recording layer by a movable optical apparatus and the relevant magneto-optical disk is rotated at constant angular velocity (CAV). Of course, this means that the velocity of the outer regions of the relevant magneto-optical disks is greater than the velocity of their inner regions. Consequently, during writing of the data with the aid of the pulse-modulated write laser beam, the known phenomenon of pulse crowding occurs in the inner regions of the magneto-optical disks, ie. at small radii, which means that the unmagnetized regions or spots are closer and closer together as the radius decreases. Furthermore, the recording layer is more strongly heated in the inner region of the disk than in the outer region.

If the power of the write laser and the chemical composition of the recording layer in the outer region of the disk are optimally adjusted, the inner region may nevertheless heat up excessively in the case of storage layers having a spatially constant chemical composition, resulting in poorly formed and possibly overlapping domains and hence giving lower signals and lower signal/noise ratios during reading. On the other hand, insufficiently good write and erase properties are observed in the outer region for such storage layers when the laser power and the chemical composition have been optimized with regard to the inner region of the disks.

It is known that the data recorded in the magneto-optical disks can, if required, be erased by controlled local heating of their magneto-optical recording layer, for example by means of a laser beam with the simultaneous action of an external or intrinsic magnetic field, the field lines of which are directed at right angles to the surface of the recording layer, after which further data can be recorded, ie. the write process is reversible.

Data are usually read using linearly polarized light of a continuous-wave laser beam whose luminous power is not sufficient to heat the material above the critical temperature. This laser beam is reflected either by the recording layer itself or by a reflector layer arranged behind said recording layer, an inter-action taking place between the magnetic moments in the recording layer and the electromagnetic field of the laser light. As a result of this interaction, the plane of polarization of the reflected laser light is rotated through a small angle with respect to the original plane. If this rotation of the plane of polarization during reflection of the light takes place at the recording layer itself, it is referred to as the Kerr effect and the angle of rotation is accordingly referred to as the Kerr angle; if, on the other hand, the plane is rotated when the light passes twice through the recording layer, the terms Faraday effect and Faraday angle are used. This rotation of the plane of polarization of the laser light reflected by the magneto-optical disk can be measured with the aid of suitable optical and electronic apparatuses and converted into signals.

Pulse crowding has considerable disadvantages during reading of the data, because it is not possible to differentiate with the required accuracy between the spots close together. Hence, the inner regions of the conventional magneto-optical disks have a poorer signal/noise ratio than the outer regions.

The disadvantages described above can be reduced, at least theoretically, by changing the angular velocity of the magneto-optical disk as a function of the position of the write laser beam over the relevant magneto-optical disk. However, such a long time is required for this change and the subsequent stabilization of the angular velocity that this measure is unacceptable in the case of magneto-optical disks which have in fact been developed specially for particularly rapid writing and recovery of digital data.

Pulse crowding could also be reduced by decreasing the recording frequency. However, this would be done at the expense of the data density, which is likewise unacceptable.

The stated disadvantageous nonuniformities occurring over the radius of the disk can be reinforced in the known disks by radial gradients in the chemical composition.

For example, it is known that cathode sputtering of conventional (RE-TM) targets leads to a radial gradient in the concentration of the RE or TM atoms, which gradient depends on the target/substrate distance and on the microstructure of the target.

Conventional magnetron sputtering of homogeneous (RE-TM) alloy targets gives, in the case of substrate/target distances which are not too large, an RE concentration which decreases radially outward, and the variation of the RE concentration may be several atom %. The position of the compensating temperature $T_{comp}$ and hence the temperature dependence of $H_c$ and $M_s$ are sensitive to this gradient of the RE concentration. Consequently, the domain shape changes in the radial direction of the disk, also resulting in radially non-uniform signal/noise ratios.

The radial gradient of the RE concentration can be reduced by using targets having suitable amounts of pure TM and of (RE-TM) compound phases. However, the large amount of magnetically soft TM phase in such targets leads to poor utilization of material and to a short target life.

JP-A-63/074143 describes a magneto-optical recording medium in whose (RE-TM) recording layer the concentration of the transition metals increases in the radial direction from the inside to the outside and the concentration of the rare earth metals decreases from the inside to the outside. The recording layers having a radially inhomogeneous concentration distribution were produced by sputtering of homogeneous targets, the target being offset with respect to the substrate during sputtering. (RE-TM) alloys which are suitable for the recording layer are NdDyFeCoTi, TbFe, GdTbFe, TbFeCo, GdTbFeCo and SmGdFeCo. The radially inhomogeneous recording layers have a radius-independent signal/noise ratio.

Another considerable disadvantage of the stated (RE-TM) alloys is their lack of corrosion resistance. When the layers are in direct contact with air or water vapor, progressive oxidation of the magneto-optical layer over a large area occurs, resulting initially in a reduction in the Kerr angle and in the reflectivity and hence in a decrease in the signal/noise ratio and finally leading to completely oxidized layers which are useless for magneto-optical purposes.

A possible method for improving the corrosion resistance of magneto-optical recording media based on (RE-TM) alloys is to apply a transparent protective layer to the front and back in order to reduce direct contact of the recording layer with air and to prevent the entry of oxygen or water molecules by diffusion. This is possible only as very dense, crack-free and pore-free layers, for example of $Si_3N_4$ or AlN. However, the additional deposition of the transparent protective layers before and after application of the recording layer makes the production process for a magneto-optical disk substantially longer and more expensive. Furthermore, defects in the protective layer, for example pinholes or cracks, may lead to corrosion of the lower-lying magneto-optical storage layer. Expensive quality control of the deposited protective layers is therefore necessary to ensure its protective effect. Even in protective layers which are pinhole-free and crack-free, there is a high probability of direct contact of the (RE-TM) layer to be protected with oxygen or moisture at the outer edge of the protective layer. In these peripheral areas, corrosion effects can therefore also occur. Undermigration of the protective layer by oxygen or moisture can subsequently emanate from these initially localized areas, leading to an enlargement of the corrosion area and a total destruction of the stored information in these areas.

An alternative method for improving the corrosion behavior of amorphous (RE-TM) alloys is to form alloys with corrosion inhibitors, ie. elements which delay corrosion of the recording layer. A number of (RE-TM) alloys having homogeneously alloyed corrosion inhibitors are known. For example, EP-A1-0 229 292 describes a magneto-optical recording medium which consists of an (RE-TM) alloy with an additional element, for example Ti, Cr, Al, Pt, Zr, V, Ta, Mo, W, Cu, Ru, Rh, Pd, Nb, Ir or Hf. The addition of the said elements delays the decrease in the coercive force and in the Kerr angle during storage of the magento-optical layer in direct contact with moist air.

U.S. Pat. No. 4,693,943 describes a magneto-optical recording medium having an amorphous (RE-TM) alloy of the composition $[(GdTb)_{1-y}(Fe\text{—}Co)y]_{1-p}Cr_p$, where $0.5 \leq y \leq 0.9$ and $0.001 \leq p \leq 0.3$. The addition of Cr substantially improves the corrosion stability of the magneto-optical recording medium. It has been found that the corrosion stability increases monotonically with increasing Cr content.

In the said U.S. Pat. No. 4,693,943, however, no change in the magnetic characteristics were found as a result of the addition of chromium.

JP-A-62/267 942 describes a photomagnetic recording medium which contains a recording film in which the concentration of at least one of the elements from the group consisting of Ta, Al, Nb, Zr, Ti, Mo or Cr increases in the direction of growth of the film. This is intended to improve the corrosion protection without adversely affecting the magnetic characteristics.

JP-A-63/140 076 describes a vertically magnetic recording film which was formed by lamination of 10–30 Å thick film of at least one rare earth metal from the group consisting of Sm, Eu, Gd, Tb, Dy and Ho with a 10–30 Å thick film of at least one transition metal from the group consisting of Fe, Co, Ni and Cr and heating to 150°–300° C.

A substantial disadvantage of the use of corrosion inhibitors is that the magnetic and magneto-optical properties of the recording medium are, as a rule, adversely affected by alloying the corrosion inhibitor. In many cases, the Kerr angle is reduced and the temperature dependence of the magnetization and the coercive force are adversely affected, with the above-mentioned negative effects on the write and read behavior of the recording medium.

It is an object of the present invention to provide a magneto-optical disk according to the preamble, which has high corrosion stability, freely adjustable, radially constant write sensitivity, carrier values which are independent of the radius and low noise levels. The carrier value is defined in a known manner as the height of the maximum in the frequency spectrum which is obtained in frequency analysis of the read signal at the recording frequency.

We have found that this object is achieved, surprisingly, by changing the chromium concentration in the magneto-optical recording layer in the horizontal direction.

The present invention accordingly relates to a magneto-optical disk having at least one optically transparent dimensionally stable substrate and at least one magneto-optical recording layer consisting of a chromium-containing (RE-TM) alloy, wherein the chromium concentration changes in the magneto-optical recording layer in the horizontal direction.

The essential component, according to the invention, of the novel magneto-optical disk is the novel magneto-optical recording layer. The said disk may also contain two novel magneto-optical recording layers in the suitable arrangements described below.

As is the case of the conventional magneto-optical recording layers, the novel magneto-optical recording layer to be used according to the invention likewise consists of a chromium-containing, ferri-magnetic, amorphous (RE-TM) alloy which contains magnetic transition metals. Preferred magnetic transition metals are iron and cobalt.

Examples of suitable lanthanides for the novel magneto-optical recording layer are praseodynium, neo-dynium, samarium, europium, gadolinium, terbium, dysprosium and holmium. Terbium, gadolinium and dysprosium are particularly suitable among these.

A suitable recording layer of the novel magneto-optical disk has the mean composition $$R_zFe_{100-x-y-z}Co_xCr_y$$

where R is at least one element from the series consisting of the rare earth elements La, Ce, Pt, Ho, Nd, Sm, Eu, Gd, Tb and Dy.

Preferably, $10<z<40.0<x<40$ and $0.01<y<20$ and, where R is Tb, particularly preferably $15<z<25.4<x<25$ and $5<y<15$.

In addition to chromium, the alloys to be used according to the invention may contain further corrosion-inhibiting elements.

Examples of other suitable elements which have a corrosion-inhibiting effect are scandium, yttrium, lanthanum, cerium, thorium, uranium, titanium, zirconium, hafnium, vanadium, niobium, tantalum, cobalt, molybdenum, tungsten, manganese, rhenium, ruthenium, osmium, rhodium, iridium, nickel, palladium, platinum, copper, silver, gold, zinc, cadmium, boron, aluminum, gallium, indium, thallium, carbon, silicon, germanium, tin, lead, phosphorus, arsenic, antimony and bismuth.

These elements are preferably chosen so that an increase in the magneto-optical effect is achieved. Preferred metals which increase the Kerr angle are platinum, gold, lead and bismuth. Cobalt, which increases the Kerr angle and the Curie temperature, is a particularly preferred metal.

Cobalt is present in the production of a particularly preferred embodiment of the novel disks, so that, by specifying the poor concentration of cobalt, the magneto-optical properties can be adjusted in a particularly simple manner.

As the chromium content in the recording layer increases, the corrosion stability increases while the Kerr angle and the Curie temperature decrease monotonically.

In a particularly preferred embodiment of the novel disks, the effect of Cr on the level of the read signal and on the optimal write power can consequently be compensated b a higher cobalt content in the chromium-containing (RE-TM) layers.

In order to compensate as completely as possible the reduction in the read signal due to chromium, the increase in the mean cobalt content dx is related to the mean chromium content y, for which the following relationship is advantageously applicable:

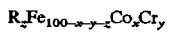

$$0.6<dx/y<1.4.$$

Here, the mean chromium or cobalt content is the content (in atom %) which the magneto-optical recording layer would have for a homogeneous concentration distribution of chromium or cobalt.

Furthermore, traces of nitrogen, oxygen, sulfur, selenium, tellurium, fluorine, chlorine, bromine and/or iodine may be present in the novel magneto-optical recording layer.

Examples of suitable combinations of elements which are present in the alloys to be used according to the invention or in the novel magneto-optical recording layer, and the atomic ratios in which the elements can be advantageously combined with one another, are known per se and are disclosed in, for example, EP-A-184 034, U.S. Pat. No. 4,693,943, DE-C-34 40 391, EP-A-0 302 393 or EP-A-0 229 292.

Examples of particularly suitable combinations of elements are SmCoCr, GdCoCr, GdFeCr, TbFeCr, TbCoCr, GdTbCoCr, NdFeCoCr, NdDyFeCoCr, SmDyFeCoCr, SmDyFeNiCoCr, TbFeCoCr, GdTbFeCr, GdFeCoCr, DyFeCoCr, GdTbFeCoCr or GdTbFeNiCoCr, of which GdTbCoCr and GdTbFeCoCr are preferred and TbFeCoCr is particularly preferred.

The feature which is essential for the invention and which fundamentally distinguishes the novel magneto-optical recording layer of the novel disks from the conventional magneto-optical recording layers is the horizontal gradient of the chromium concentration in the novel magneto-optical recording layer, ie. in the novel magneto-optical recording layer the concentration of the chromium changes in the horizontal direction, in contrast to the conventional recording layers. The chromium concentration in individual sectors or areas of the novel magneto-optical recording layer may change in different ways, but it is preferred according to the invention if the chromium concentration changes uniformly over the entire area of the novel magneto-optical recording layer. According to the invention, it is advantageous if the chromium concentration changes in the radial direction. It is particularly advantageous if the chromium concen- tration increases from the inner edge of the novel magneto-optical recording layer toward its outer edge.

The change in the chromium concentration over the radius of the magneto-optical recording layer can preferably be described by a mathematical function which is continuous within the length of the radius.

In systems having dielectric protective layers, the corrosion stability should in particular be high where the surface protective layer tends to form pinholes or cracks or has borders. Corrosion experiments show that the outer edges of the protective layer are a particular point of attack for localized corrosion. To achieve high corrosion protection, a high concentration of Cr should therefore be achieved at the outer edge of the layer. Toward the inside of the disk, on the other hand, a decrease in the Cr concentration is advantageous for increasing the Kerr angle.

In a particularly advantageous embodiment of the invention, the Cr content increases roughly or exactly linearly within the physical error limits with increasing radius and reaches the maximum value, required for good corrosion protection, at the outer edge of the disk. Surprisingly, a Cr content increasing radially outward in the novel (RE-TM) layer furthermore had a very advantageous effect on the radial variation of the write sensitivity.

In a magneto-optical disk having a radially homogeneous chemical composition of the storage layer, a constant angular velocity of the disk in conjunction with constant laser pulse conditions leads to a decrease in the quantity of heat deposited per unit area with increasing radius. Because the Curie temperature of the disk is constant over the radius, the optimum write performance of the medium must increase in an outward direction in order to avoid large variations in the recording characteristics along the radius. The novel distribution of the chromium content leads to a roughly linear decrease in the Curie temperature $T_c$ with increasing radius, which decrease counteracts the reduced supply of heat.

The radial sensitivity curve of the novel layers can therefore be adjusted so that recording can take place on the entire disk with the same optimal write performance, independently of the radius. The optimum gradient of the Cr content depends in general on the overall structure of the magneto-optical disk, in particular on the thermal conductivity properties of the deposited layer system. For example, magneto-optical disks having a three-layer structure comprising dielectric/storage layer/dielectric have a steeper gradient of the optimum laser power than MO media having a four-layer structure comprising dielectric/storage layer/ dielectric/metal, since, in the last-mentioned disks, the additional metal layer ensures rapid removal of heat. Steeper gradients in the optimum write performance require steeper gradients of the Cr content in the radial direction.

In a particularly preferred embodiment, the absolute value of the write performance can readily be adapted to the drive conditions (for example rotational speed, laser power, laser pulse time, etc.) by varying the Co content.

The novel horizontal change in the chromium concentration results in a change in the compensation temperature $T_{comp}$ of the ferrimagnetic alloy of which the magneto-optical recording layer is composed. It is known that the compensation temperature $T_{comp}$ a temperature at which the total magnetization $M_s$ of the ferrimagnetic alloy or of the magneto-optical recording layer approaches 0 in the outward direction.

With increasing Cr content, the compensation temperature $T_{comp}$ increases. The decrease in the compensation temperature $T_{comp}$ from the inner edge to the outer edge, which decrease is due to the RE gradient, which is typically formed during sputtering of homogeneous alloy targets, and the decrease in the disadvantageous radial variation of $H_c$ and $M_s$ and of their temperature dependence are thus effectively counteracted. This results in a uniform radial variation of $H_c$ and of $M_s$ and hence homogeneous domain switching behavior. Here, homogeneous domain switching behavior means that smooth-edged domains are formed regardless of the radius. In a preferred embodiment of the invention, $T_{comp}$ is constant over the total radial length of the magneto-optical recording layer.

The result is that a uniform, high signal/noise ratio is achieved during reading.

Any remaining variations in $T_{comp}$ can be eliminated by adapting the phase component of the intermetallic alloys in the target. In contrast to prior art targets, however, small amounts of the magnetically soft TM phase are required to enable the targets to be sputtered in the magnetron mode at a high rate and with good utilization of material.

The absolute value of the compensation temperature can be adjusted in a known manner by adding further lanthanides and/or transition metals and/or changing the lanthanide/transition metal ratio.

The novel magneto-optical recording layer of the novel disk has a thickness in the conventional, known range. In general, this is from 10 to 500 nm.

The novel magneto-optical recording layer is produced during the production of the novel magneto-optical disk.

The novel magneto-optical disk contains, in addition to the novel recording layer, the optically transparent, dimensionally stable substrate as a further essential component.

Examples of advantageous dimensionally stable substrates are the conventional, known, disk-shaped, optically transparent, dimensionally stable substrates. In general, these consist of optically transparent ceramic materials or of plastics. They usually have a diameter of from 50 to 200 mm, advantageously from 80 to 150 mm, in particular from 90 to 130 mm. In general, they are from 0.5 to 1.5 mm, preferably from 0.8 to 1.3 mm, thick.

An example of a suitable optically transparent, dimensionally stable ceramic material is glass. Examples of suitable optically transparent, dimensionally stable plastics are polycarbonate, polymethyl methacrylate, polymethylpentene, cellulose acetobutyrate, mixtures of polyvinylidene chloride and polymethyl methacrylate and mixtures of polystyrene and poly(2,6-dimethylphen-1,4-ylene ether). Among these, the dimensionally stable substrates of plastics are particularly advantageous.

Those surfaces of the dimensionally stable substrate which face the novel magneto-optical recording layer may have structures.

The structures in the surface of the dimensionally stable substrate are in the micrometer and/or sub-micrometer range. They serve for exact guidance of the read laser beam and ensure rapid and exact response of the tracking and autofocusing means in the laser-optical write and read heads of the disk drives, ie. they permit or improve the tracking. Furthermore, these structures may themselves be data, as is the case, for example, in the known audio or video compact disks, or they may be used for coding the recorded data. The structures consist of raised parts and/or indentations. These are in the form of continuous concentric or spiral tracks or isolated hills and/or holes. Moreover, the structures may have a more or less smooth wave shape. The tracks are preferred here. They have in their transverse direction a rectangular sawtooth-like contour, a V-shaped contour or a trapezoidal contour. Their indentations are generally referred to as grooves and their raised parts as land. Tracks having from 50 to 200 nm deep and from 0.4 to 1.0 µm wide grooves separated from one another by a 1–3 µm wide land are particularly advantageous.

The particularly preferably used dimensionally stable substrate is produced in a conventional manner by shaping the plastic mixture or plastic forming the substrate with the aid of the injection molding method, if necessary under clean-room conditions, as described in, for example, DE-A-37 27 093.

The novel magneto-optical disk may contain at least one further layer in addition to the dimensionally stable substrate and the novel magneto-optical recording layer.

The arrangement of the various layers depends on whether the magneto-optical storage layer is exposed to laser light from the substrate side or air side during writing or reading. Exposure from the substrate side is preferred.

In the latter case, a conventional, known anti-reflection layer of an optically transparent dielectric material having a high refractive index may be present, for example between the dimensionally stable substrate and the novel magneto-optical recording layer. The refractive index is greater than that of the substrate but lower than that of the recording layer. This material usually contains oxides and/or nitrides or consists of these compounds.

In addition, a further optically transparent dielectric layer containing oxides and/or nitrides or consisting of oxides and/or nitrides may be present on that side of the novel magneto-optical recording layer which faces away from the substrate.

Furthermore, a conventional, known reflector layer, which usually consists of metals, may be present on that side of the novel magneto-optical recording layer which faces away from the dimensionally stable substrate, directly on the said side or on a transparent layer of oxides and/or nitrides arranged thereon.

The novel magneto-optical disk may furthermore have a conventional, known dielectric protective or anti-corrosion layer which contains carbides, oxides and/or nitrides or consists of carbides, oxides and/or nitrides, on that side of the reflector layer which faces away from the novel magneto-optical recording layer and/or on at least one side of said recording layer.

The additional layers (reflector layer or protective/anticorrosion layer) may also be composed of a plurality of separate strata. These layers may be X-ray amorphous or polycrystalline.

The thickness of these additional layers is generally known and is stated, for example, in the prior art cited at the outset.

It is however also possible to expose the magneto-optical recording layer from the air side, directly or through any transparent antireflection and/or protective layers present. In this case, the anti-reflection layer is arranged on that side of the magneto-optical recording layer which faces away from the substrate. Accordingly, the reflector layer is present between the substrate and the magneto-optical recording layer.

Further examples of suitable possibilities for arranging the various layers novel magneto-optical disk are disclosed in U.S. Pat. No. 4,710,418.

For special applications, the novel magneto-optical disk may also have at least one further conventional, known, magnetizable layer. This magnetizable layer may be a magnetically hard or magnetically soft layer or a conventional, known magneto-optical recording layer. The further novel magneto-optical recording layer is also suitable for this purpose.

The reflector layer, the anticorrosion layer and the further layers are produced during production of the novel magneto-optical disk, the order of the individual production or process steps depending on the particular structure of the novel magneto-optical disks.

Two of the novel magneto-optical disks described above may furthermore be combined with one another to form a sandwich in such a way that their recording layers face one another and are a certain distance apart. The conventional, known methods for combining two magneto-optical disks, as disclosed in, for example, U.S. Pat. No. 4,751,124 or DE-A-37 18 302, are used for this purpose.

The production of the novel magneto-optical disk starts from the dimensionally stable substrate described above, on one surface of which the novel magneto-optical recording layer in the desired thickness and having the composition required according to the invention and, if necessary, the further dielectric and/or metal layers and the further magnetizable layers in the desired order, number and thickness and having the desired structure are applied from the gas phase, after which a defined magnetization oriented at right angles to the novel magneto-optical recording layer is induced in a conventional, known manner in said recording layer.

The novel magneto-optical recording layer and any further layers present are applied by the conventional, known methods for the production of thin layers by vapor deposition, reactive vapor deposition, ion plating, ion cluster beam deposition (ICB), cathode sputtering, reactive cathode sputtering, magnetron cathode sputtering or reactive magnetron sputtering, the cathode sputtering methods preferably being used.

In cathode sputtering, the corresponding metals, carbides, oxides, nitrides and/or any other compounds used are sputtered in the desired order and amount from a sputtering target placed at the cathode, under reduced pressure, in a process gas atmosphere, and are deposited on the dimensionally stable substrate or on a layer already present thereon. Usually, the process gas contains a noble gas, such as argon.

In reactive cathode sputtering, further reactive gases, such as hydrogen, hydrocarbons, oxygen, nitrogen, etc. are mixed in the desired amount with the process gas at a suitable time. As a result, by sputtering a metal, for example in the presence of hydrocarbons, oxygen and/or nitrogen in the process gas, the relevant metal oxide, nitride, carbide, carbide oxide, carbide nitride, oxide nitride or carbide oxide nitride layers can be deposited directly. The thickness, the structure and the compostion of the relevant layers can be adjusted in a known manner via the sputtering rate, the deposition rate, the process gas pressure and the process gas composition.

In (reactive) magnetron cathode sputtering, the target is known to be a magnetic field.

Examples of suitable sputtering processes are disclosed in U.S. Pat. No. 4,670,353, U.S. Pat. No. 4,670,316 or DE-A-37 35 385.

In a variant of the novel process, the novel magneto-optical recording layer is produced by cathode sputtering or magnetron cathode sputtering of a chromium-containing (RE-TM) alloy of suitable external form as the sputtering target, under reduced pressure, in a process gas atmosphere, and by deposition of the chromium-containing lanthanide/transition metal alloy from the gas phase onto the surface of the dimensionally stable substrate or onto a layer already present thereon, a disk-shaped or annular sputtering target of inhomogeneous composition being used according to the invention.

The term inhomogeneous composition indicates that, in the sputtering target, chromium concentration changes as a function of the radius or in the horizontal direction. This change in the chromium concentration may be continuous or discontinuous.

The change in the chromium concentration over all radii of the sputtering target may be uniform or non-uniform. According to the invention, it is advantageous if the chromium concentration changes uniformly over all radii of the sputtering target, and particularly advantageous if it changes uniformly in the radial direction.

In addition, the chromium concentration in the sputtering target may change in such a way that, within the error limits, it can be described approximately or exactly by a mathematical function which is continuous within the length of the radius.

It is advantageous if the changes in the chromium concentration within the sputtering target is linear, ie. it can be represented within the error limits approximately or exactly by a straight line.

A disk-shaped or annular sputtering target in which the chromium concentration increases from the inner edge to the outer edge of the sputtering target is very particularly preferably used for the production of the novel magneto-optical recording layer. It is very particularly advantageous if the chromium concentration increases in accordance with a mathematic function which is continuous within the length of the radius.

The controlled change in the chromium concentration in the sputtering target can in principle be effected if the sputtering target is composed of concentric rings which differ from one another in composition in a suitable manner. For example, the outer concentric rings may have a higher or lower chromium concentration than the inner concentric rings of the sputtering target. Furthermore, the major part of the sputtering target may consist of an (RE-TM) alloy in which chromium-rich regions are preferably incorporated in an annular manner, this incorporation advantageously being effected at the surface of the sputtering target. The change in the chromium concentration can be controlled by varying the number, the area and/or the composition of the chromium-rich regions in a suitable manner.

Alternatively, the controlled change in the chromium concentration in the sputtering target can be effected by using a sputtering target in which chromium-rich bodies of suitable external shape are arranged on the surface of the radially homogeneous or inhomogeneous (RE-TM) alloy. The change in the chromium concentration can be adjusted by varying the number, the external shape and size and the surface concentration of the chromium-rich bodies in a suitable manner. The surface concentration is defined here as the total weight of the chromium-rich bodies per unit area. In a preferred embodiment, the chromium-rich bodies consist of thin disks which have a diameter of from 3 to 15 mm and a thickness of from 0.1 to 3 mm and contain more than 50 atom % of chromium. The chromium-containing bodies are particularly preferably arranged on the surface of the radially homogeneous or inhomogeneous (RE-TM) alloy, the surface concentration increasing from the inner to the outer edge.

Which of the sputtering targets described above are used for the production of the magneto-optical recording layer present in each of the novel magneto-optical disks depends primarily on the desired composition of the relevant novel magneto-optical recording layer. The choice can be made in a simple manner by the skilled worker taking into account the fact that the chromium concentration gradient in the sputtering target is transferred to the novel magneto-optical recording layer to be produced.

Data in the form of magnetically reversed spots can be recorded on the novel magneto-optical disks in the conventional manner from the side bearing the optically transparent, dimensionally stable substrate with the aid of an impulse-modulated write laser beam focused on the novel magneto-optical recording layers and striking the latter at right angles, said write laser beam having a wavelength $\lambda$ of less than 1,000 nm. Thereafter, the data can be read with the aid of a continuous-wave laser beam focused on the data-bearing novel magneto-optical recording layers and striking the latter at right angles, the light reflected by the recording layers themselves or by reflector layers being collected, analyzed and converted into signals. In the case of the novel magneto-optical disks, the conventional, known laser-optical disk drives having laser-optical heads which contain semiconductor lasers can be used for this purpose.

The novel magneto-optical disks have particular advantages over the prior art. For example, they can be recorded on at higher disk speeds than known magneto-optical disks, using the same laser power. Furthermore, their bit density can be substantially increased compared with the prior art. During reading, they give un-distorted signals and have a very high signal/noise ratio. It should be noted that both their recording sensitivity and their signal/noise ratio are no longer significantly dependent on the radius but are uniformly high over the total surface of the novel magneto-optical recording layer. In addition, the novel magneto-optical recording layers can be adapted in an excellent but simple manner to the property profile of the other layers which may be present in the novel magneto-optical disks, permitting optimization of the magneto-optical disks in a manner previously unknown and/or thought to be impossible.

Furthermore, the novel magneto-optical disks have a freely adjustably, radially constant write and erase sensitivity during recording.

The novel magneto-optical disks have high stability to corrosion. Compared with prior art disks, they have high corrosion stability even where there is a particularly high risk.

In the preferred novel recording layers, the radial variation of the chromium concentration, which increases from the inside to the outside, counteracts the disadvantageous radial variation of coercive force and magnetization usually encountered during sputtering of homogeneous alloy targets, and their temperature dependencies.

For the same reasons, smaller amounts of the magnetically soft TM phase are required in the targets compared with the prior art, enabling the targets to be sputtered in the magnetron mode with a high deposition rate and utilization of material.

EXAMPLES 1 TO 8

Examples 1 to 4 describe magneto-optical recording layers having a radially homogeneous composition. These Examples demonstrate the effect of chromium on the magneto-optical properties and the long-term stability for magneto-optical recording layers having different compositions. Example 3 also shows, for a magneto-optical recording layer having a radially homogeneous composition, how in principle the effect of chromium on the magneto-optical properties can be compensated by the addition of, for example, cobalt.

In Examples 5 and 6, prior art magneto-optical recording layers having a radially homogeneous composition (Example 5) and novel magneto-optical recording layers having a radially inhomogeneous composition (Example 6) are compared with one another in terms of the optimum write power required for recording. In Examples 7 and 8, a corresponding comparison is made with regard to the carrier values (Example 7) and the compensation temperature $T_{comp}$ (Example 8).

Example 1

A target of $Gd_6Tb_{14}Fe_{75}Co_5$ (diameter 200 mm) was used in d.c. voltage cathode sputtering unit. Cr disks having a diameter of 6 mm and a thickness of 2 mm were uniformly distributed over this target. To obtain chromium concentrations which are different but radially homogeneous, the number of chromium disks was varied from 0 to 0.15 disks per cm$^2$ in a total of four experiments. In each of these four experiments, a glass sheet (diameter 130 mm) was arranged parallel to the target at a distance of 65 mm. The vacuum chamber of the cathode sputtering unit was evacuated to $1\times10^{-7}$ mbar. Ar gas was then introduced until the pressure reached $5\times10^{-3}$ mbar. By applying a d.c. voltage at a sputtering power of 500 W, a thin layer having a thickness of 100 nm was deposited.

The composition of the layers was chemically analyzed in each case by ICP spectroscopy (ICP: induced coupled plasma). The Kerr angle was measured using an He—Ne laser of wavelength 633 nm from the air side as a function of a variable external magnetic field. It was found that the deposited layers have an axis of easy magnetization in a direction at right angles to the surface of the thin layer. To investigate the stability to corrosion, the layers were stored in a conditioned cabinet at constant temperature and humidity (80° C., 80% relative humidity). Measurement of the Kerr angle was repeated at certain time intervals. It was found that the residual Kerr angle decreased with increasing storage time. The decrease depends on the chemical composition of the storage layer and can be characterized by the parameter $t_{0.5}$. The $t_{0.5}$ denotes the time in which the Kerr angle has decreased to 50%.

Table 1 summarizes the chemical composition, the saturation Kerr angle theta before storage and the $t_{0.5}$ values for the layers of Example 1.

TABLE 1

| Chemical composition | Theta (degree) | $t_{0.5}$ (h) |
|---|---|---|
| $Gd_6Tb_{14}Fe_{75}Co_5$ | 0.24 | 6 |
| $(Gd_6Tb_{14}Fe_{75}Co_5)_{98}Cr_2$ | 0.23 | 18 |
| $(Gd_6Tb_{14}Fe_{75}Co_5)_{93}Cr_7$ | 0.19 | 330 |
| $(Gd_6Tb_{14}Fe_{75}Co_5)_{88}Cr_{12}$ | 0.14 | 6000 |

Example 2

A target of $Tb_{22}Fe_{78}$ (diameter 150 mm) was used in a d.c. voltage cathode sputtering unit. Initially disks (diameter 6 mm, thickness 2 mm) of Tb (0.4 disk per cm$^2$) and Co (0.2 disk per cm$^2$) were distributed uniformly over the target. To obtain chromium concentrations which are different but radially homogeneous, the number of chromium disks was varied from 0 to 0.20 disk per cm$^2$ in a total of four experiments. In these four experiments, a glass sheet (diameter 130 mm) was arranged parallel to the target at a distance of 60 mm. The vacuum chamber of the cathode sputtering unit was evacuated to $1\times10^{-7}$ mbar. Ar gas was then introduced until the pressure reached $6\times10^{-3}$ mbar. By applying a d.c. voltage at a sputtering power of 500 W, a thin layer having a thickness of 100 nm was deposited in each case.

Chemical analysis of the layers and determination of the Kerr angle and investigation of the stability to corrosion were carried out as described in Example 1. In Example 2 too, it was found that the deposited layers have an axis of easy magnetization in a direction at right angles to the surface of the thin layer.

Table 2 summarizes the chemical composition, the saturation Kerr angle theta before storage and the $t_{0.5}$ values for the layers of Example 2.

TABLE 2

| Chemical composition | Theta (degree) | $t_{0.5}$ (h) |
|---|---|---|
| $Tb_{25}Fe_{67}Co_8$ | 0.20 | 7 |
| $(Tb_{25}Fe_{67}Co_8)_{95}Cr_5$ | 0.17 | 100 |
| $(Tb_{25}Fe_{67}Co_8)_{91}Cr_9$ | 0.14 | 1050 |
| $(Tb_{25}Fe_{67}Co_8)_{84}Cr_{16}$ | 0.055 | >10000 |

Tables 1 and 2 show that, for (Gd—Tb—Fe—Co—Cr) layers and for (Tb—Fe—Co—Cr) layers, the $t_{0.5}$ value and hence the stability to corrosion increase with increasing Cr content. However, this is accompanied by a sharp decrease in the Kerr angle and hence in the magneto-optical signal. Comparison with Example 1 shows in particular that the corrosion stabilization by Cr and the decrease in the Kerr angle are independent of the specific choice of the basic alloy or of the target.

Example 3

A target of $Tb_{22}Fe_{78}$ (diameter 150 mm) was used in a d.c. voltage cathode sputtering unit. Initially disks of Tb (diameter 6 mm, thickness 2 mm, 0.4 disk per cm$^2$) and then different numbers of disks of Co and Cr (diameters 6 and 10 mm, respectively, thickness 2 mm) were uniformly distributed over this target. To obtain the different but radially homogeneous chromium and cobalt concentrations, the number of cobalt disks per cm$^2$ was varied from 0.2 to 0.5 and that of the chromium disks per cm$^2$ was varied from 0 to 0.12 in a total of four experiments. In each of these four experiments, a glass sheet (diameter 130 mm) was arranged parallel to the target at a distance of 60 mm. The vacuum chamber of the cathode sputtering unit was evacuated to $1\times10^{-7}$ mbar. Thereafter, Ar gas was introduced until the pressure reached $6\times10^{-3}$ mbar. By applying a d.c. voltage at a sputtering power of 500 W, a thin layer having a thickness of 100 nm was deposited in each case.

Table 3 shows the chemical composition and saturation Kerr angle theta for the layers of Example 3. The said composition and angle were determined as described in Example 1.

TABLE 3

| Chemical composition | Theta (degree) |
|---|---|
| $(Tb_{20}Fe_{80})_{92}Co_8$ | 0.21 |
| $(Tb_{20}Fe_{80})_{82}Co_8Cr_{10}$ | 0.11 |
| $(Tb_{20}Fe_{80})_{78}Co_{12}Cr_{10}$ | 0.15 |
| $(Tb_{20}Fe_{80})_{70}Co_{20}Cr_{10}$ | 0.19 |

As shown in Table 3, the decrease in the Kerr angle due to inclusion of Cr in the alloy can be compensated by simultaneously increasing the Co content of the alloy. The ratio of the Cr content y and the increase in the Co content dx should be $0.6 < dx/y < 1.4$ in order to achieve as complete a compensation as possible of the effects of Cr on the magneto-optical properties. Corrosion experiments on the samples mentioned in Table 3 furthermore showed that the stability to corrosion increases with increasing Co content. Thus, the increase in the Co content has an advantageous effect on the corrosion behavior of the (RE-TM) layer (cf. in this context Gimenez et al. in IEEE Transactions on Magnetics, 24 No. 2 (1988), 1738–1740).

Example 4

A target of Al (diameter 200 mm) and a target of $Tb_{22}Fe_{78}$ (diameter 150 mm) were used in a d.c. voltage cathode sputtering unit. As described in Example 2, metal disks of Tb and Co and different numbers of disks of Cr were uniformly distributed over the (Tb—Fe) target. In several experiments, a glass sheet (diameter 130 mm) was arranged parallel to the targets at a distance of 60 mm. The vacuum chamber of the cathode sputtering unit was evacuated to $1 \times 10^{-7}$ mbar. A 1:4 $N_2$/Ar mixture was then introduced until the pressure reached $1 \times 10^{-3}$ mbar. By applying a d.c. voltage over the Al target, a 5 nm thick AlN layer was deposited at a sputtering power of 500 W. Ar gas was then introduced until pressure reached $5 \times 10^{-3}$ mbar. By applying a d.c. voltage at a sputtering power of 500 W, a (Tb—Fe—Co—Cr) layer having a thickness of 100 nm was deposited. A 5 nm thick AlN layer was then once again deposited under the same conditions as above. To investigate the stability to corrosion, layers were stored in a conditioned cabinet at constant temperature and humidity (80° C., 80% relative humidity). After a storage time of 850 hours, the disks having a low Cr content showed signs of corrosion especially at the outer edge of the AlN coating. On the other hand, disks having a high Cr content (greater than 10 atom %) showed no corrosion effects at the outer edge of the disks.

Example 5

A target of Al (diameter 200 mm) and a $Tb_{22}Fe78$ target (diameter 150 mm) were used in a d.c. voltage cathode sputtering unit. Initially disks of Tb (diameter 6 mm, thickness 2 mm, 0.4 disk per $cm^2$) were uniformly distributed over the Tb—Fe target. To obtain different but radially homogeneous cobalt and chromium concentrations, disks of cobalt (diameter 6 mm, thickness 2 mm, 0.2–0.6 disk per $cm^2$) and chromium (diameter 10 mm, thickness 2 mm, 0–0.25 disk per $cm^2$) were uniformly distributed. In several experiments, a transparent sheet of polycarbonate having embossed tracks (diameter 30 mm) was arranged parallel to the target at a distance of 60 mm. The vacuum chamber of the cathode sputtering unit was evacuated to $1 \times 10^{-7}$ mbar. A 1:4 $N_2$/Ar mixture was then introduced until the pressure reached $1 \times 10^{-3}$ mbar. The polycarbonate sheets were coated as follows: by applying a d.c. voltage over the Al target, a 80 nm thick AlN layer was deposited at a sputtering power of 500 W. Ar gas was then introduced until the pressure reached $6 \times 10^{-3}$ mbar. By applying a d.c. voltage at a sputtering power of 500 W, a (Tb—Fe—Co—Cr) layer having a thickness of 80 nm was deposited. A 80 nm thick AlN layer was then once again deposited under the same conditions as above.

Example 6

The layers were produced as in Example 5, except that the disks of Co and Tb were uniformly distributed over the surface of the $Tb_{28}Fe_{72}$ target (diameter 200 mm), while the chromium disks were arranged radially over the target surface, the number per $cm^2$ increasing from the inside to the outside.

Investigations with regard to the optimum recording power were carried out for the disks of Examples 5 and 6 using a magneto-optical drive. For this purpose, the disk was rotated at a constant angular velocity of 1800 rpm. A periodic square-wave signal having a frequency of 3.7 MHz was recorded on different radii of the disk using a focused infrared laser (wavelength 830 nm) from the substrate side in an external magnetic field of 300 Oe. For reading, a continuous linearly polarized laser beam having a power of 1 mW was focused on the tracks containing previously recorded data and the reflected light was detected by means of a polarization-sensitive optical system. The detected signal was subjected to frequency analysis, the carrier at the single recording frequency and that at the double recording frequency being measured with a bandwidth of 30 kHz as a function of the recording power and of the radius. It was found that, at a fixed radius, the carrier at the single recording frequency increased sharply above a certain recording energy and then passed through a maximum. The carrier at the double recording frequency simultaneously has a minimum. The optimum recording power is defined as the laser power at which the carrier of double recording frequency has a minimum.

Table 4 shows, for the layers of Example 5, the optimum recording power determined at a radially constant Cr content y, at various radii for different Co contents x. The measured data in Tables 4 and 5 are applicable for chromium contents y of from 0 to 15 atom %.

TABLE 4

| x−y (Atom %) | 30 mm | R 45 mm | 60 mm |
|---|---|---|---|
| 4.4 | 3.5 | 5.4 | 7.0 |
| 9.0 | 5.3 | 6.7 | 9.5 |
| 12.1 | 6.0 | 8.4 | >10 |

Table 4 shows that, at a fixed Cr content, the optimum recording power increases with increasing Co content. For radially constant Cr and Co contents, however, it shows an undesirably high dependence on the radius.

It was found that, depending on the difference between Co content x and Cr content y, it is possible to obtain a Cr gradient such that the disk can be recorded on at all radii using the same laser power. Table 5 shows, as a function of the difference x-y, the Cr gradient to be set and the optimum recording power achieved.

TABLE 5

| x−y (atom %) | Cr content (atom %) | | | Optimum recording power | |
|---|---|---|---|---|---|
| | 30 mm | 45 mm | | 60 mm | (mW) |
| 4 | y−6 | y | | y + 4 | 5 |
| 9 | y−6 | y | | y + 7 | 6.5 |
| 12 | y−10 | y | | y + 7 | 8.5 |

To illustrate the invention further, two novel disks are compared below with the corresponding conventional disks.

In the first case, a conventional disk which was produced according to Example 5 had a uniform composition $Tb_{20}Fe_{51}Co_{19}Cr_{10}$ over its entire surface. The optimum recording power was found to be 5.3 mW at a radius of 30 mm, 6.7 mW at 45 mm and 9.5 mW at 60 mm. For the corresponding novel disk, which was produced according to Example 6, the composition changed virtually linearly from $Tb_{22}Fe_{55}Co_{19}Cr_4$ at a radius of 30 mm to $Tb_{18}Fe_{46}Co_{19}Cr_{17}$ at a radius of 60 mm. For the novel disk, a radius-independent value of 6.5 mW was found for the optimum recording power.

In the second case, a conventional disk, which was produced according to Example 5, had the uniform composition $Tb_{18}Fe_{46}Co_{24}Cr_{12}$ over its entire surface. The optimum recording power was found to be 6.0 mW at a radius of 30 mm, 8.4 mW at 45 mm and greater than 10 mW at 60 mm. For the corresponding novel disk, which was produced according to Example 6, the composition changed virtually linearly from $Tb_{21}Fe_{53}Co_{24}Cr_2$ at a radius of 30 mm to $Tb_{18}Fe_{41}Co_{24}Cr_{19}$ at a radius of 60 mm. For the novel disk, a radius-independent value of 8.5 mW was found for the optimum recording power.

Example 7

Magneto-optical disks were produced as described in Examples 5 and 6.

Investigations into the dependence of the recording behavior of the amount of heat introduced by the laser pulse were carried out using a magneto-optical drive. For this purpose, the disk was rotated at variable angular velocities. A period square-wave signal was recorded from the substrate side using a focused infrared laser (wavelength 830 nm) at a laser power of 10 mW and in an external magnetic field of 300 Oe. The amount of heat per unit area was varied by simultaneously varying the recording frequency (0.9–3.6 MHz) and the angular velocity of the disk (600–2,400 rpm), in a ratio of the recording frequency to the linear velocity being kept constant. 0.5 nJ of heat per pulse was thus realized at a frequency of 3.6 MHz and an angular velocity of 2,400 rpm. 2 nJ of heat per pulse were realized at a frequency of 0.9 MHz and an angular velocity of 600 rpm. During reading, a continuous linearly polarized laser beam having a power of 1 mW was focused on the tracks containing previously recorded data and the reflected light was detected using a polarization-sensitive optical system. The detected signal was subjected to frequency analysis, the carrier at the single recording frequency being measured with a bandwidth of 30 kHz.

Table 6 shows, for disks having different, homogeneously distributed Cr contents in the recording layer, the carrier values (in dBm) at the single recording frequency as a function of the amount of heat supplied.

TABLE 6

| Composition | Amount of heat (nJ) | | |
|---|---|---|---|
| | 0.5 | 1.0 | 2.0 |
| $Tb_{18}Fe_{46}Co_{19}Cr_{17}$ | −22 | −26 | −43 |
| $Tb_{18}Fe_{47}Co_{20}Cr_{15}$ | −14 | −12 | −32 |
| $Tb_{19}Fe_{50}Co_{21}Cr_{10}$ | −20 | −5 | −8 |
| $Tb_{20}Fe_{53}Co_{22}Cr_5$ | −50 | −9 | −4 |

Table 6 shows that, in the case of recording layers having a homogeneously distributed chromium content, the carrier shows a pronounced dependence on the amount of heat supplied per unit area. At high Cr contents, large amounts of heat lead to a decrease in the carrier owing to enlarged domains, which are disadvantageous. On the other hand, media having a low Cr content cannot be recorded on in the case of small amounts of heat and suffer pronounced carrier loss.

Table 7 shows the dependence of the carrier values on the amount of heat supplied per unit area for a disk which has a Cr content which increases with increasing radius. The recording was carried out in such a way that, at constant angular velocity and constant laser power, 1.0 nJ of heat per unit area was supplied at a radius of 60 mm and 2.0 nJ of heat per unit area was supplied at a radius of 30 mm. The composition of the recording layer varied from $Tb_{20}Fe_{53}Co_{23}Cr_4$ (radius 30 mm) to $Tb_{20}Fe_{49}Co_{21}Cr_{10}$ (radius 60 mm).

TABLE 7

| Amount of heat (nJ) | Radius (mm) | Cr content (atom %) | Carrier (dBm) |
|---|---|---|---|
| 1.0 | 60 | 10 | −5 |
| 2.0 | 30 | 4 | −4 |

As shown in Table 7, a disk having a radial Cr gradient is found to have a substantially weaker dependence of the carrier on the amount of heat supplied per unit area than a disk having a homogeneously distributed Cr content (cf. Table 6). A disk-shaped recording medium having a Cr content which increases radially outward thus shows substantially lower fluctuations of the carrier along a radius and is less sensitive to fluctuations of the recording power.

Example 8

A target having a diameter of 200 mm and consisting of a homogeneous, amorphous alloy of Gd, Tb, Fe and Cr was used in a d.c. voltage cathode sputtering unit. Disks of Co (diameter 10 mm, thickness 2 mm) were placed on the target in different numbers per $cm^2$, which increased from the inner to the outer edge. A glass sheet (diameter 130 mm) was arranged parallel to the target at a distance of 45 mm. The vacuum chamber of the cathode sputtering unit was evacuated to $1\times10^{-7}$ mbar. Ar gas was then introduced until the pressure reached $5\times10^{-3}$ mbar. By applying a d.c. voltage at a sputtering power of 500 W, a thin layer having a thickness of 100 nm was deposited.

The chemical composition and the magnetic properties of the layer were investigated as a function of the radius. Table 8 shows the chemical composition and the variation of the composition temperature ($T_0$=323 K) along the disk radius for a prior art disk (a) and a novel disk (b) having a radial chromium gradient, the chromium concentration increasing from the inner to the outer edge.

The radial RE gradient found for disks (a) and (b) is due to separation processes during sputtering of the homogeneous alloy target.

TABLE 8

| | (a) Prior art | | | (b) Invention | | |
|---|---|---|---|---|---|---|
| R (mm) | RE content (atom %) | Cr content (atom %) | $T_{comp}$ | RE content (atom %) | Cr content (atom %) | $T_{comp}$ |
| 30 | 20.5 | 7 | $T_0$ + 40 K | 20.5 | 4 | $T_0$ + 5 K |
| 45 | 19.5 | 7 | $T_0$ | 19.5 | 7 | $T_0$ |
| 60 | 18.5 | 7 | $T_0$ − 40 K | 18.5 | 10 | $T_0$ − 10 K |

The disk having the chemically homogenous recording layer showed a strong dependence of the compensation temperature and hence of the difference $T_c-T_{comp}$ the radius, while in the case of the novel disk the radial dependence of $T_{comp}$ was greatly reduced, resulting in a medium having a substantially higher signal/noise ratio.

For the production of the novel magneto-optical disk, it is therefore also possible to use homogeneous alloy targets without any adverse effect on the radial uniformity of the compensation temperature.

We claim:

1. In a magneto-optical disk having a central opening; an inner edge; an outer edge; at least one optically transparent, dimensional stable substrate; at least one magneto-optical recording layer consisting of a chromium-containing lanthanide rare earth metal/transition metal alloy, which disk has a radial length extending from the center of the center opening to the outer edge, the improvement comprising the chromium concentration in the magneto-optical recording layer increases continuously radially from the inner edge to the outer edge.

2. The magneto-optical disk of claim 1, wherein the magneto-optical recording layer consists of the alloy $R_zFe_{100-x-y-z}Co_xCr_y$, which alloy exhibits a mean concentration from the inner edge to the outer edge which is represented by the expression $10<Z<40$, $0<X<40$ and $0.01<y<20$ and R is at least one rare earth element selected from the group consisting of La, Ce, Pr, Ho, Nd, Sm Er, Gd, Tb and Dy.

3. The magneto-optical disk of claim 1, wherein the magneto-optical recording layer contains a total magnetization $M_z$ and exhibits a compensation temperature $T_{comp}$, at which $M_z$ becomes 0 in the radial direction, and wherein the $T_{comp}$ is constant over the total radial length of the magneto-optical recording layer.

4. The magneto-optical disk of claim 1, wherein at least one dielectric layer is applied to either the lower surface, or the upper surface, or both the upper and lower surfaces of at least one magneto-optical recording layer.

5. The magneto-optical disk of claim 1, wherein a metallic layer is applied to that side of the magneto-optical recording layer which faces away from the substrate, directly or on a dielectric layer arranged thereon.

6. The magneto-optical disk of claim 2, wherein R is Tb and $15<z<25$, $4<x25$ and $5<y<15$.

7. The magneto-optical disk of claim 4, wherein the one or more dielectric layers consist of a metal carbide, metal nitride or metal oxide or a mixture thereof.

* * * * *